2 Sheets—Sheet 1.
A. BECK,
Assignor, by mesne assignments, to L. DRYFOOS.
Quilting-Machine.
No. 9,097. Reissued Feb. 24, 1880.
*Fig. 1,*
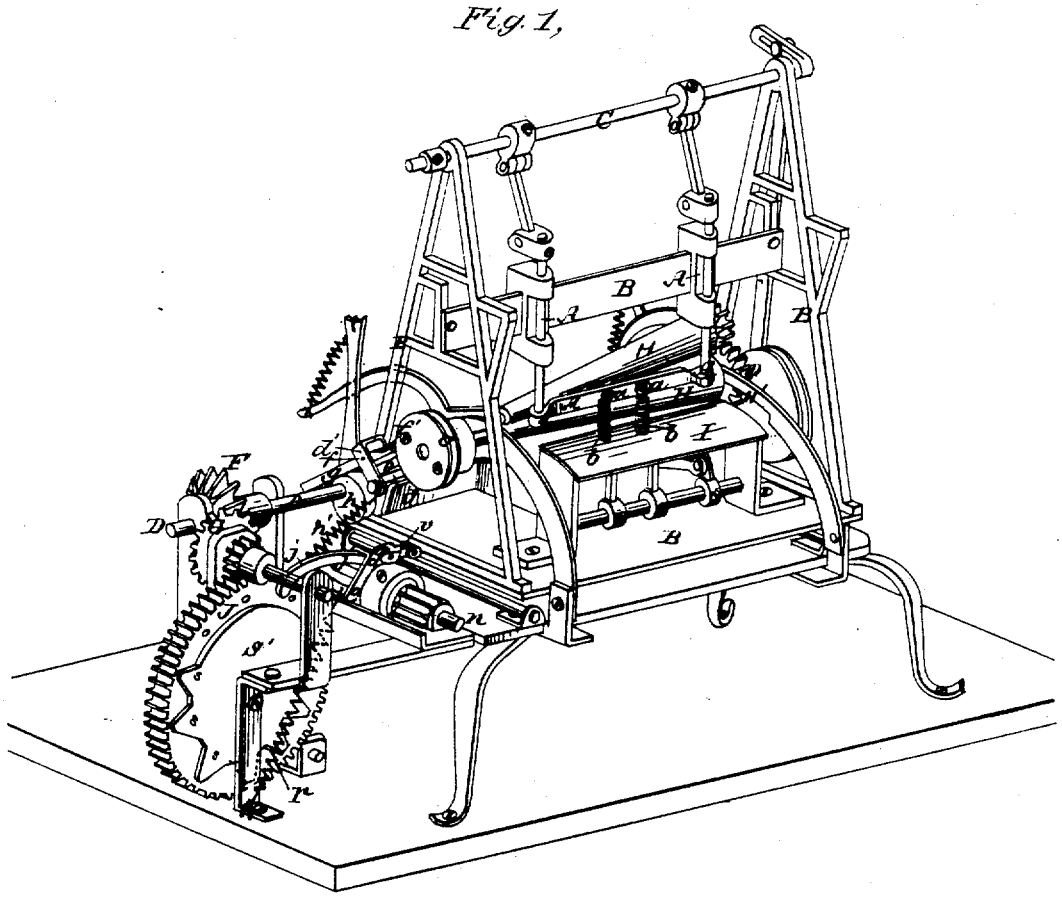
WITNESSES
Geo. Geo. Dick
INVENTOR
August Beck,
by M. Bailey
his ATTORNEY.
N. PETERS, PHOTO-LITHOGRAPHER, WASHINGTON, D. C.

A. BECK,
Assignor, by mesne assignments, to L. DRYFOOS.
Quilting-Machine.
No. 9,097. Reissued Feb. 24, 1880.
*Fig. 2,*
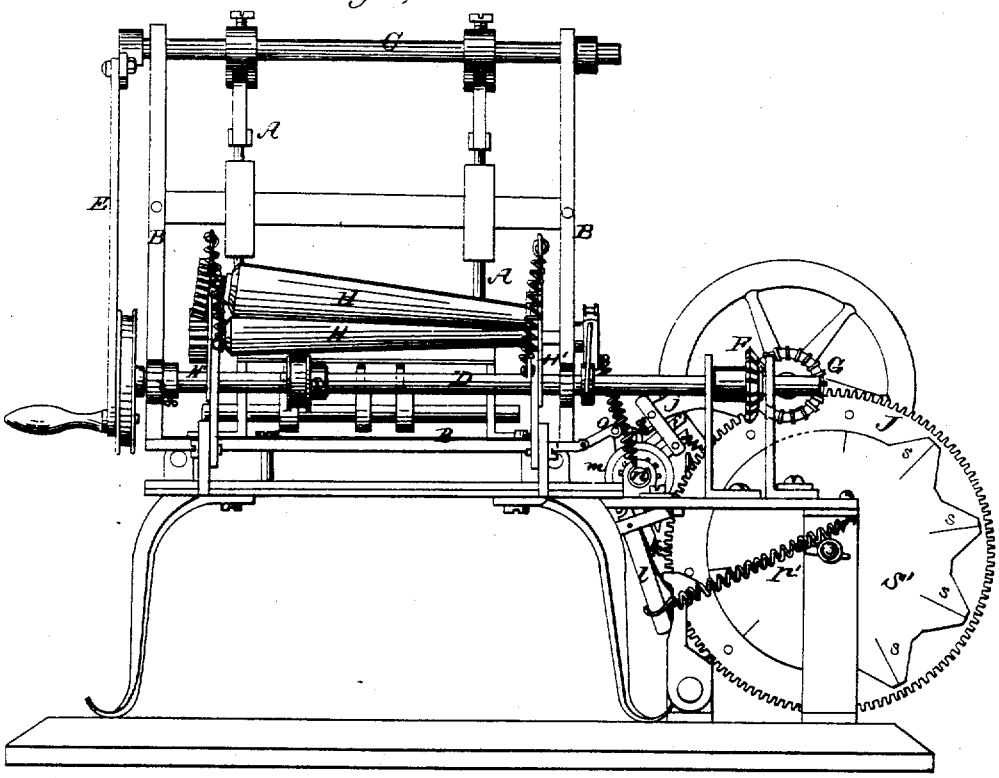
*Fig. 3,*
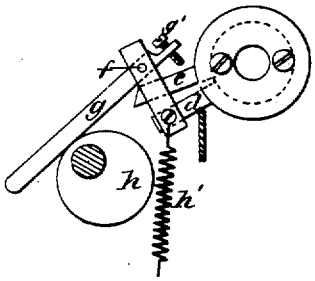
*Fig. 4,*
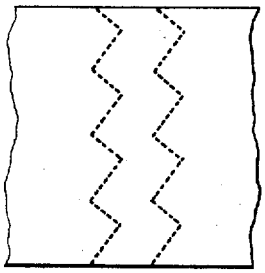
WITNESSES
Geo. W. Gill
E. A. Dick
INVENTOR
August Beck,
by M. Bailey
his ATTORNEY.
N. PETERS, PHOTO-LITHOGRAPHER, WASHINGTON, D. C.

UNITED STATES PATENT OFFICE.

AUGUST BECK, OF NEW YORK, N. Y., ASSIGNOR, BY MESNE ASSIGNMENTS, TO LOUIS DRYFOOS.

QUILTING-MACHINE.

SPECIFICATION forming part of Reissued Letters Patent No. 9,097, dated February 24, 1880.

Original No. 190,184, dated May 1, 1877; Reissue No. 8,063, dated January 29, 1878. Application for Reissue filed January 24, 1880.

*To all whom it may concern:*

Be it known that I, AUGUST BECK, of the city, county, and State of New York, have invented certain new and useful Improvements in Quilting-Machines, of which the following is a specification.

The machine to which my invention relates is a sewing-machine to be used for quilting fabrics. It may be used, however, for sewing ornamental patterns of various kinds.

My invention consists of certain improvements on the quilting-machine described and shown in Letters Patent No. 159,884, dated February 16, 1875, these improvements having reference to the feed and the mechanism for laterally reciprocating the sewing-frame. They will be explained by reference to the accompanying drawings, in which—

Figure 1 is a perspective view of the machine. Fig. 2 is a rear elevation of the same. Fig. 3 is a side elevation, on an enlarged scale, of the mechanism through the intermediary of which the feed is effected. Fig. 4 is a pattern of the stitching made by the machine.

I shall give but a general and brief description of such parts of the machine as are not immediately related to my improvements. The general organization does not materially differ from that of the machine described in my above-recited Letters Patent.

Before proceeding to a description of my improvements, which, as above stated, relate to the feed and to the mechanism for laterally reciprocating the sewing-frame, I would remark that in the use of my patented machine difficulty was experienced in the use of the presser-feet, which, under the arrangement described in the patent, were apt to rub and drag on the cloth, which was, therefore, at times caused to follow the reciprocating movement of the sewing-frame. The arrangement itself was, moreover, somewhat complicated and cumbersome.

I now use with each and every needle bar or holder *a* an annular vertically-yielding presser-foot, *b*, attached to and moving up and down with the bar and surrounding the needle. The presser-feet thus press the goods only during the formation of the stitches. They rise with the needles, and their pressure on the goods is entirely taken off when the needles are out of the cloth. They are made vertically yielding by being in part composed of spirally-coiled wire springs, as shown.

The needle-holding frame (marked A) moves up and down in guides in the laterally-reciprocating sewing-frame B, this up-and-down movement being imparted from a rock-shaft, C, which is operated by a crank and driving-shaft, D, through the medium of a connecting-rod, E, jointed to a slotted arm on shaft C, in which arm its joint-pin is adjustable to or from the axis of the shaft C, in order to regulate the length of the needle-stroke.

The driving-shaft D is rotated by gearing F G, the gear-wheel F having fixed bearings, and being connected with the shaft D by a spline-and-groove connection, which permits the shaft to laterally reciprocate with the sewing-frame independently of the driving-gear.

In my patented machine the regular forward feed of the goods was effected by feed-rollers intermittingly rotated by means of a pawl and ratchet. No adequate provision was there made for a change of feed, and when conical bodies of skirts or skirt-borders were to be quilted it was necessary to drag the material through on one side, at the same time crowding it back on the other, as is done on ordinary sewing-machines. This, while being easily and readily effected on such machines, and the material being turned under and around a single needle, without any inconvenience to the operator and without injury to the fabric or to the parts of the mechanism which hold the material, cannot be done in connection with a gang of needles with a feeding mechanism holding the material both intermittingly during the intervals of stitches and continuously between sets of rollers without great manual difficulty to the operator and without such strain upon the material and friction upon the feeding mechanism as will endanger the quality of the work and the operation of the machine. To remedy this I now use a different mechanism for actuating the feed-rolls, and so organize it that the length of feed may be varied at pleasure.

I also have devised for the purpose of feeding conical strips of goods—such as the conical bodies of skirts or skirt-borders—a feed device op-

BEST AVAILABLE COPY erating intermittingly between the formation of the stitches, which extends substantially throughout the width of the conical strip of goods, and which, as it departs from the shorter curved edge and approaches the longer curved edge of the goods, is adapted to have a proportionately increased range of feed-movement so that it will feed the conical strip of goods in the requisite curved path evenly and without any injurious strain or drag.

The feed device in which I have embodied this feature of my invention consists, as shown in the drawings, of feed-rolls H, which are made of conical shape and of such taper or relative diameters at their respective ends as to conform to the shape of the skirt or border to be quilted.

The cloth to be sewed passes over the cloth-plate I, under and back of the lower roll, thence up between the two rolls and to the front of the upper roll, over which it finally passes. The rolls are made conical only for the purpose above mentioned. To feed straight goods they are made cylindrical. They do not move with the sewing-frame. They have no movement of lateral reciprocation, but revolve in bearings formed in a stationary frame, H′. They act intermittently, resting during the formation of the stitch, and feeding the goods when the needles are out of the cloth.

The intermittent movement of rotation is produced as follows: The lower roll is the one that is positively acted on. The other roll has movable boxes acted on by springs, which cause it to bear with yielding pressure on the lower roll, the two rolls being geared together, as shown.

The shaft or journal of the lower roll is at one end prolonged to extend beyond its bearing, and on this prolonged end is mounted a hub, the periphery of which is encircled by a spring ring-like clasp, *c*, which is not a continuous ring, but has separate ends, one of which, *d*, carries a yoke, *d′*. The other end, *e*, directly above the end *d*, is free, and normally is somewhat separated from the other. Pivoted at *f* in the yoke *d* is a lever, *g*, whose shorter arm overhangs the end *e*, and whose longer arm is in contact with a cam, tappet, or eccentric, *h*, on the driving-shaft, said part *h* being of a width sufficient to allow it to reciprocate with the sewing-frame without quitting the lever.

When the longer arm of the lever is raised by the cam its shorter arm bears on the end *e* of the spring-clasp, and first forces it down toward the other end, and so causes the clasp to clutch the hub. The continued movement of the lever now causes the hub to make a movement of partial rotation, thus operating the feed-roll. The extent of the movement of the roll is determined by the amount of lost motion of the lever, and this lost motion is regulated by means of a screw, *g′*, in the shorter arm of the lever, which may be caused to approach the end *e* of the clasp more or less, as required.

I thus, in effect, have a friction-clutch which is caused to engage and operate the feed by means of a vibratory lever, which is caused to act on the clutch sooner or later in its stroke, according to the length of stitch required. The lever is held down to the eccentric *h* by a spring, *h′*.

The same kind of mechanism is employed to give movement to the laterally-reciprocating sewing-frame. In this case, however, as seen in the drawings, the mechanism is duplicated, one friction-clutch, *i*, and lever *j* being required to move the frame in one direction, and one friction-clutch, *k*, and lever *l* being required to move the frame in the other direction. The mechanisms are mounted one on one side and the other on the other side of a central flange, *m*, on a shaft, *n*, which is rocked back and forth by the action of the clutches, and is connected with the sewing-frame by a rod, *o*, jointed at one end to an arm projecting from the sewing-frame, and at the other end to a radial arm projecting from the shaft *n* or from the flange *m* thereon.

The levers *j* and *l* are held by springs *p p′* against the pattern-cams, by which they respectively are acted on, and this brings me to the last portion of my improvements, which relates to a pattern mechanism, or mechanism for giving to the sewing-frame the lateral movement required for the particular pattern to be made.

In my patented machine I use for this purpose a peripherally cam-grooved pattern-wheel. This wheel is required to be changed not only for each regular feed—*i. e.*, for varying lengths of stitches—but also for every figure or pattern. To remedy inconveniences arising from this plan I have now adopted a permanent wheel, J, gearing with the driving mechanism, and carrying on its opposite faces the cam-points *s*, which operate the levers of the friction-clutches. These cam-points are removable from the wheel, and may be replaced by others, so that with the same wheel any number of pattern-cams can be interchangeably used. The cam-points *s* may be in one piece with the central disk S′, or they may be made separate from the disk and attached independently of one another to the wheel. The wheel is of a size to make one element of the design or pattern, so that at each revolution of the wheel one element of the design will be completed. For instance, the cams shown in the drawings will make the zigzag pattern shown in Fig. 4, and that pattern is c[illegible]nposed of a number of elements, each of w[illegible] consists of up-and-down lines in V fo[illegible]hile the series of cams on one side of the [illegible]act on one lever the other lever is opp[illegible] the open space on the cam-disk on the ot[illegible]de of the wheel. Thus the one set of cams, acting on one lever by a series of intermittent impulses, draws the sewing-frame in one direction. Those cams then become inactive, and the opposite set commences to act on the other lever, causing the frame to move in a similar manner in the other direction, thus, in conjunction with the regular forward feed, causing a pattern to be produced like that shown in Fig. 4.

I have described only so much of the machine as required to illustrate my improvements. The stitch-forming mechanisms, one for each needle, may be of any approved pattern, embracing tension, take-up, spool-holder, shuttle, or hook for the under thread, &c.

Having described my improvements, what I claim, and desire to secure by Letters Patent, is—

1. In a machine for quilting conical strips of goods, the combination, with the series or gang of sewing mechanisms and the cloth-plate which supports the goods under the action of the same, of a feed device operating intermittingly in the intervals between the formation of the stitches, which extends and operates substantially across or from edge to edge of the conical strip of goods, and which, as it departs from the shorter curved edge and approaches the longer curved edge of said goods, is adapted to have a proportionately increased range of feed-movement, substantially as and for the purposes set forth.

2. The combination, with a series of vertically-reciprocating needles mounted in a laterally-reciprocating sewing-frame, of conical feed-rolls and mechanism for causing them to act intermittingly during the intervals between the formation of stitches, substantially as herein shown and described.

3. The described mechanism for operating the feed, consisting of a friction-clutch clasping the feed-shaft, in combination with a vibratory pivoted lever supported on one end of the clutch, and having one of its arms overhanging but not attached to the other and free end of the clutch, substantially as set forth, so that the movement of said lever shall cause the clutch first to close upon the shaft and then to rotate the same, as set forth, whether the said mechanism be used to operate the forward or lateral feed.

4. The combination of the friction-clutch, the feed-shaft embraced by the same, and the vibratory lever provided at that end, which acts on the clutch, with means of adjustment, whereby the lost motion of the lever may be increased or decreased at pleasure to regulate the length of feed.

5. The combination, with the sewing-frame, of the pattern-wheel and removable pattern-cams, one set on each face of the wheel, the one set designed to move the sewing-frame in one direction and the other set in the other direction each set acting alternately on the frame, and both being removable, to allow different sets of pattern-cams to be interchangeably used on the same wheel.

6. The pattern-wheel with removable pattern-cams, one set on each face of the wheel, in combination with the friction-clutches and their operating-levers, one set for each set of pattern-cams, and a rock-shaft, on which said clutches are mounted, connected with and imparting a laterally-reciprocating movement to the sewing-frame, substantially as herein shown and set forth.

In testimony whereof I have hereunto set my hand this 13th day of January, 1880.

AUGUST BECK.

Witnesses:
GEORGE F. LANGBEIN,
E. J. SCHLEPEGRELL.